United States Patent [19]

Ikemoto et al.

[11] Patent Number: 4,820,087

[45] Date of Patent: Apr. 11, 1989

[54] TAP DRIVE UNIT FOR MACHINE TOOLS

[75] Inventors: Shigeru Ikemoto, 258-banchi, Honmaeda-cho, Nakagawa-ku, Nagoya, Aichi; Minoru Ohta, Nagoya, both of Japan

[73] Assignee: Shigeru Ikemoto, Japan

[21] Appl. No.: 106,581

[22] Filed: Oct. 8, 1987

[30] Foreign Application Priority Data

Oct. 14, 1986 [JP] Japan .............................. 61-243787
Jun. 30, 1987 [JP] Japan .............................. 62-162652

[51] Int. Cl.$^4$ .............................................. B23B 47/14
[52] U.S. Cl. ........................................ 408/9; 408/138
[58] Field of Search ............... 408/6, 9, 11, 129, 137, 408/138, 141

[56] References Cited

U.S. PATENT DOCUMENTS

| | | | |
|---|---|---|---|
| 2,165,396 | 7/1939 | Mansfield | 408/138 |
| 2,784,267 | 3/1957 | Nackenhorst | 408/9 |
| 2,830,310 | 4/1958 | Smith | 408/9 |
| 2,869,153 | 1/1959 | Capek et al. | 408/137 |

*Primary Examiner*—Neil Abrams
*Attorney, Agent, or Firm*—Steele, Gould & Fried

[57] ABSTRACT

A tap drive unit for machine tools, which is coupled to the machine-head of the machine tool such as a machining center, includes a driver detachably coupled to a main spindle of the machine tool so as to be rotated with the main spindle, a support member for rotatably supporting the driver, the support member being fixedly mounted on a stationary portion of the machine tool when the driver is coupled to the main spindle of the machine tool, a tubular guide member supported by the support member so as to be concentric with the driver, and a rotational shaft on one end of which a tap is mounted. The guide member is axially moved when a load larger than a predetermined value acts on it. An internal thread is formed in the inner periphery of the guide member. An external thread is formed in the outer periphery of the rotational shaft so as to be threadably engaged with the internal thread. When the main spindle of the machine tool is rotated, the rotational shaft is axially moved in accordance with the pitch of the tap by the interaction of the internal and external threads. Obstruction of the downwardly axial movement of the tap applies a load upon the guide member which then moves upwardly and operates a mechanism to reverse the direction of the spindle.

5 Claims, 6 Drawing Sheets

TAP DRIVE UNIT FOR MACHINE TOOLS

BACKGROUND OF THE INVENTION

The present invention relates to a tap drive unit coupled to the machine-head of a machine tool such as a machining center for cutting screw-threads inside cavities of workpieces by power feeding a tap.

In known machine tools such as a machining center, a tap is coupled to a main spindle of the machine tool. The machine-head of the machine tool, supporting the main spindle, is moved toward a workpiece in accordance with rotation of the main spindle.

When the machine-head of the machine tool is moved in synchronization with the rotation of the main spindle, the main spindle of the machine tool is required to be provided with a rotary encoder for detecting the rotation of the main spindle to perform an arithmetic operation, thereby controlling the axial movement of the machine-head of the machine tool. However, it is difficult, on the point of accuracy, to move the machine-head of the machine tool in accordance with the pitch of the tap.

The prior art provides an improvement wherein a chuck is supported on the main spindle of the machine tool through a coil spring. The chuck is adapted to be axially displaced slightly. In the case of a workpiece having a small thickness, however, the accuracy with which the screw-thread is formed in the workpiece is reduced owing to the spring forces acting on the chuck. Furthermore, it is impossible for the tap to perform the threading operation where the machine tool is not provided with the rotary encoder.

SUMMARY OF THE INVENTION

Therefore, an object of the present invention is to provide a tap drive unit for machine tools such as a machining center, which is attached to the machine tool such as a machining center and which is capable of forming screw-threads in the workpieces with high accuracy.

In view of the above-mentioned object and others, the tap drive unit for machine tools in accordance with the present invention comprises a driver detachably coupled to to a main spindle of the machine tool so as to be rotated with the main spindle, a support member for rotatably supporting the driver, the support member being fixedly mounted on a stationary portion of the machine tool when the driver is coupled to the main spindle of the machine tool, a tubular guide member supported by the support member so as to be concentric with the driver and provided with an internal thread formed in the inner periphery thereof, a rotational shaft provided with a tap detachably mounted on one end thereof and an external thread formed in the outer periphery thereof so as to be threadably engaged with the internal thread, the rotational shaft being rotated when the rotation of the main spindle of the machine tool is transmitted thereto through the driver, thereby being axially moved in accordance with a pitch of the tap in cooperation of the internal and external threads.

According to the tap drive unit in accordance with the present invention, the tap is axially advanced accurately in accordance with its pitch, thereby securing the formation of the screw-threads with high accuracy and ease.

According to another form of the tap drive unit for machine tools, a travel mechanism is provided on the support member so as to be traveled when the rotational shaft and the guide member are axially moved. Further, a detecting mechanism is provided on a stationary portion of the machine tool for detecting travel distance of the travel mechanism.

Other and further objects of this invention will become obvious upon an understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENTS

Figure 1:
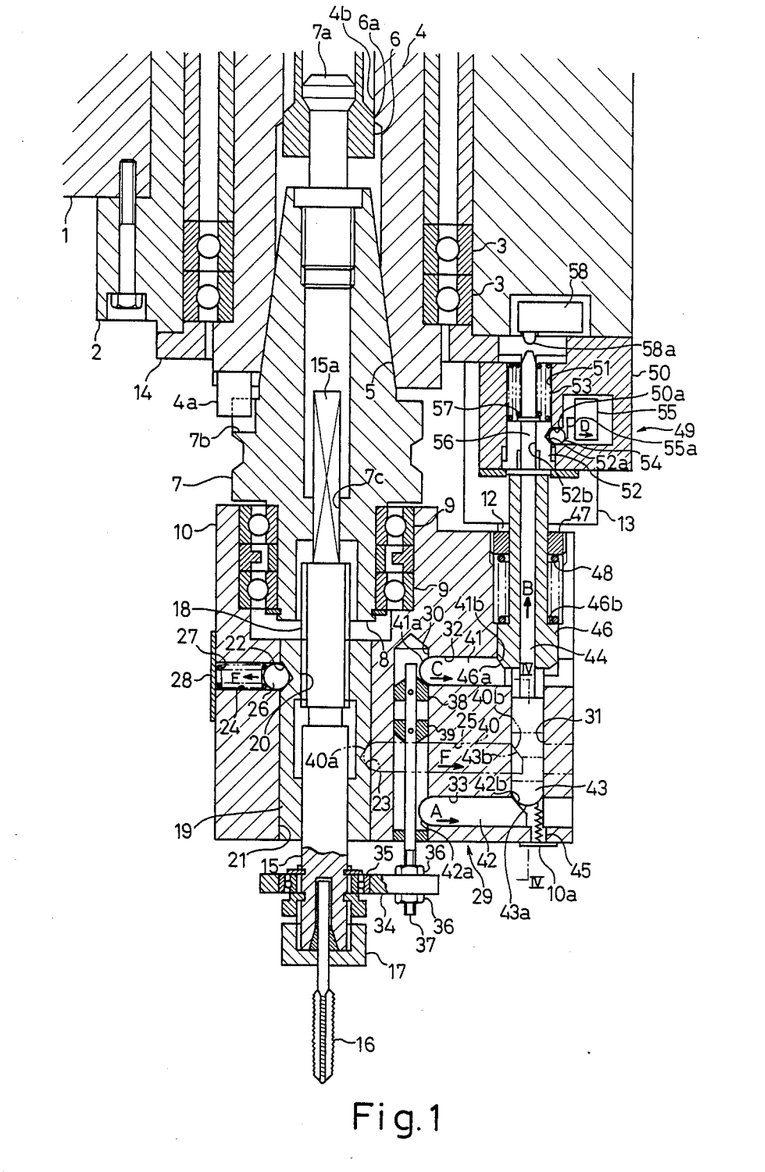
FIG. 1 is a longitudinal section of the tap drive unit of a first embodiment.
Figure 2:
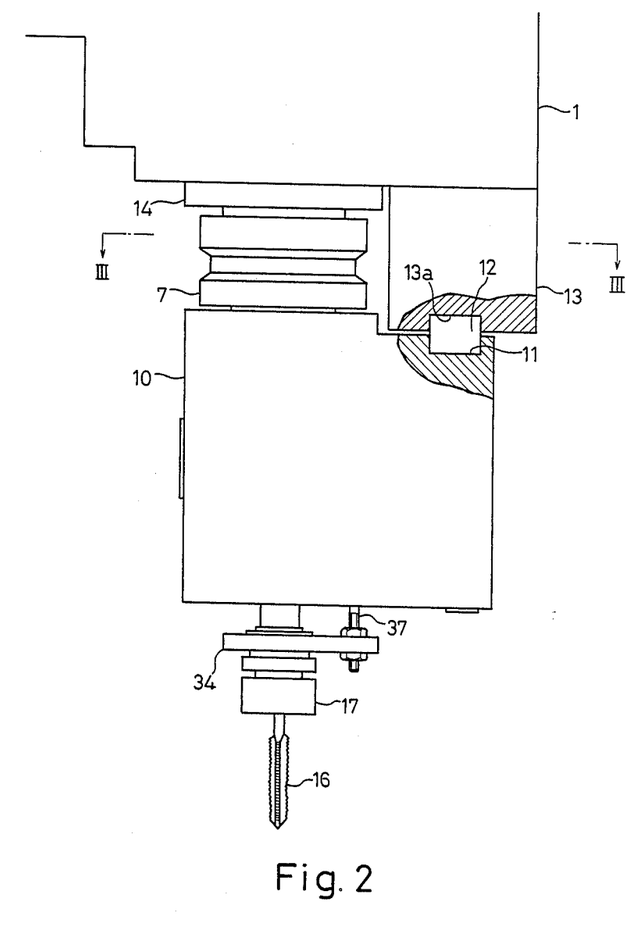
FIG. 2 is a partial side view of the tap drive unit, in which view both a support member and a support block are partly cut away to show the arrangement of a shaft.
Figure 3:
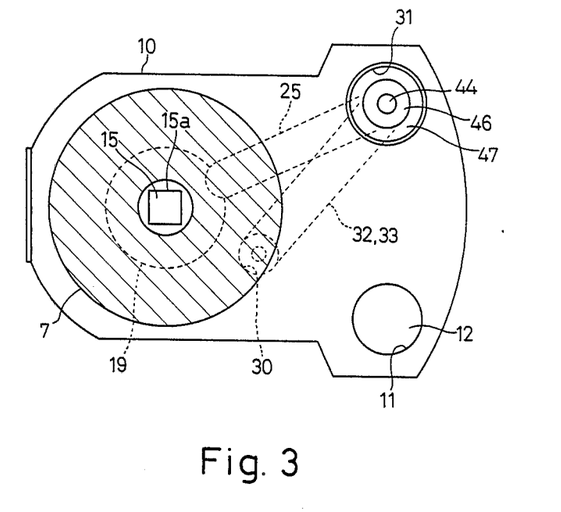
FIG. 3 is a transverse section taken along line III—III in FIG. 2.

A first embodiment of the tap drive unit in accordance with this invention will now be described with reference to FIGS. 1-4 of the drawings. Reference numeral 1 indicates a machine-head of a machining center as the machine tool. A tubular main spindle 4 is rotatably mounted on ball bearings 3 of a support 2. The main spindle 4 is rotated by a drive source (not shown). A tapered portion 5 is formed on a lower inner peripheral portion of the main spindle 4. A chuck 6 is provided within the main spindle 4. The chuck 6 is always biased upwardly by a belleville spring (not shown), as shown in FIG. 1. When the chuck 6 is moved downwardly by a hydraullic means (not shown) against forces of the belleville spring, a larger diameter stepped portion 6a of the chuck 6 is disengaged from a smaller diameter stepped portion 4b of the main spindle 4. Consequently, the stepped portion 6a is expanded outwardly, thereby unchucking a portion 7a of a driver 7. When the downward forces of the hydraullic means are eliminated, the forces of the belleville spring causes the chuck 6 to move upwardly and accordingly, the stepped portion 6a contracts to thereby chuck the portion 7a. The driver 7 of the tap drive unit is detachably engaged with the tapered portion 5 of the main spindle 4 and chucked at the portion 7a by the chuck 6, as described above. A recess 7b formed in a middle outer peripheral portion of the driver 7 is engaged with a convex portion 4a extending from the lower end of the main spindle 4 so that the rotation of the main spindle 4 is transmitted to the driver 7. A cylindrical support 8 is formed integrally with the driver 7 and extends from the lower end of the driver 7. A support member 10 is rotatably mounted on ball bearings 9 provided on the outer periphery of the cylindrical support 8. As shown in FIG. 2, a recess 11 is formed in the upper surface of the support member 10 in a spaced-apart relation to the driver 7. A shaft 12 is inserted in the recess 11 and is fixed in position. The upper portion of the shaft 12 is detachably inserted in a recess 13a of a support block 13 secured to the underside of the support 2 as the stationary portion. A member 14 is employed for fixing the ball bearings 3 in place. A rotational shaft 15 is provided with a chuck 17 for holding a tap 16 at the lower end thereof. An external thread 18 having the same pitch as the tap 16 is formed in the middle outer periphery of the rotational shaft 15. The rotational shaft 15 is also provided with a connection 15a formed on the upper end thereof and substantially square in transverse cross section. The connection 15a is engaged, for axial movement, with a connection opening 7c formed in a middle inner peripheral portion of the driver 7 and substantially square in transverse cross section.

Reference numeral 19 indicates a tubular guide member having an internal thread formed in the inner periphery thereof so as to be threadably engaged with the external thread 18. The guide member 19 is inserted in an attachment opening 21 defined by the lower inner periphery of the support member 10, so as to be axially moved. Generally V-shaped recesses 22 and 23 are formed in the outer periphery of the guide member 19. The support member 10 is provided with transverse holes 24 and 25 opposed to the recesses 22 and 23 respectively. A metallic ball 26 and a coil spring 27 are provided within the transverse hole 24. An open end of the transverse hole 24 is closed by a plate 28.

Figure 4:
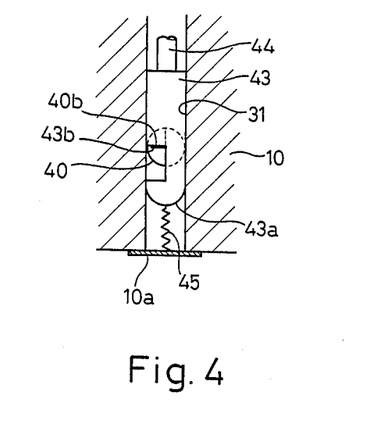
FIG. 4 is a longitudinal section taken along line IV—IV in FIG. 1.

Numeral 29 indicates a travel mechanism provided on the support member 10. Vertical holes 30 and 31 are formed in the support member 10 so as to be parallel with the rotational shaft 15. The transverse hole 25 communicates with the vertical hole 31. Further, the vertical holes 30 and 31 communicate with each other through both of the transverse holes 32 and 33. A metallic plate 34 is mounted on bearings 35 provided on the lower end of the rotational shaft 15. The plate 34 is vertically moved with the rotational shaft 15. A rod 37 is secured to the plate 34 by means of nuts 36 and inserted in the vertical hole 30. Rings 38 and 39 are mounted on the rod 37 and the positions of the rings 38 and 39 are vertically adjustable. Slide bars 40, 41 and 42 are provided within the transverse holes 25, 32 and 33 for slidable movement, respectively. Spherical surfaces 40a, 41a and 42a are formed on one ends of the slide bars 40, 41 and 42, respectively. The spherical surface 40a of the slide bar 40 is opposite to the recess 23. The rings 38 and 39 mounted on the rod 37 are adapted to be brought into contact with the spherical surfaces 41a and 42a respectively when the rod 37 is vertically moved. The slide bars 40, 41 and 42 are further provided with inclined surfaces 40b, 41b and 42b formed on the other ends thereof respectively. The inclined surfaces 40b, 41b and 42b face the inside of the vertical hole 31. A first working shaft 44 having an actuator 43 mounted on the lower end thereof is inserted in the vertical hole 31 for vertical movement. A spherical surface 43a is formed on the lower end of the actuator 43 so as to be in contact with the inclined surface 42b of the slide bar 42. As shown in FIG. 4, a middle inclined surface 43b is formed on the actuator 43 so as to be opposite to the inclined surface 40b of the slide bar 40. An extension coil spring 45 applies downwardly biasing forces to the first working shaft 44. The upper end of the extension coil spring 45 is connected to the actuator 43 and the lower end thereof is connected to a lid member 10a attached to the underside of the support member 10. A cylindrical second working shaft 46 is inserted in the vertical hole 31 for vertical movement so as to encompass the outer periphery of the first working shaft 44. An inclined surface 46a formed on the lower end of the second working shaft 46 is in contact with the inclined surface 41b of the slide bar 41. A ring-nut 47 is embedded in the upper end portion of the vertical hole 31 and is fixed in position. A coil spring 48 is provided between the ring-nut 47 and a stepped portion 46b of the second working shaft 46 so as to downwardly bias the second working shaft 46.

A detecting mechanism 49 will now be described. A holder 50 is provided in the vicinity of the recess 13a of the support 13. A cylindrical detecting piece 52 is inserted in a support opening 51 formed in the holder 50 so as to be vertically moved and is always biased downwardly by a coil spring 53. A recess 52b is formed on the outer side surface of the detecting piece 52. A transverse hole 50a is formed in the holder 50 so as to be opposed to the recess 52a. A metallic ball member 54 is provided within the transverse hole 50a. A working lever 55a of the microswitch 55 is in contact with the ball member 54. A detecting rod 56 is inserted in a hole 52b formed in the center of the detecting piece 52 for vertical movement. A microswitch 58 is provided so that an actuator 58a thereof is opposite to the upper end of the detecting rod 56. Accordingly, the lower ends of the detecting rod 56 and detecting piece 52 are opposite to the upper ends of the first and second working shafts 44 and 46 with a small space therebetween, respectively.

Operation of the tap drive unit in accordance with this invention will now be described. Forward rotation of the main spindle 4 is transmitted to the rotational shaft 15 through the driver 7. When the rotational shaft 15 is rotated, the external thread 18 is threadably engaged with internal thread 20, whereby the rotational shaft 15 is advanced. The travel of the rotational shaft 15 depends on the rotation thereof and is in accordance with the pitch of the tap 16. The tap 16 is screwed into a prepared hole formed in a workpiece (not shown) placed on a worktable (not shown), thereby tapping the workpiece. The rod 37 is advanced through the plate 34 of the travel mechanism 29 in accordance with the advancing of the rotational shaft 15. When the tapping operation is completed with the rod 37 advanced by a predetermined distance, the ring 39 is brought into contact with the spherical surface 42a of the slide bar 42, thereby displacing the slide bar 42 in the direction of arrow A. The inclined surface 42b of the slide bar 42 pushes the spherical surface 43a of the actuator 43, so that the first working shaft 44 is moved upwardly or in the direction of arrow B. Simultaneously, the detecting rod 56 is moved upwardly, thereby turning the microswitch 58 on. The main spindle 4 is reverse rotated when the microswitch 58 is turned on. The rotational shaft 15 is retracted or raised, rotating in reverse, thereby withdrawing the tap 16 from the threaded hole in the workpiece. When the rotational shaft 15 is returned to its upper limit position, the ring 38 is brought into contact with the spherical surface 41a of the slide bar 41 to thereby displace the slide bar 41 in the direction of arrow C. The inclined surface 41b of the slide bar 41 pushes the inclined surface 46a of the second working shaft 46, which is moved upwardly or in the direction of arrow B. The upward movement of the second working shaft 46 moves the ball member 54 in the direction of arrow D, thereby turning the microswitch 55 on. The rotation of the main spindle 4 is stopped when the microswitch 55 is turned on.

Where the rotational shaft 15 is forward rotated to advance the tap 16, the downward movement of the rotational shaft 15 is prevented when the tap 16 mistakenly strikes a portion of the workpiece other than the prepared hole. Consequently, upward forces are applied to the guide member 19. The biasing forces of the coil spring 27 cause the ball member 26 to be engaged with the recess 22 so that the guide member 19 is not moved upwardly during the normal tapping operation. However, when the upward forces act on the guide member 19 when the rotational shaft 15 prevented from being downwardly moved, the ball member 26 is moved in the direction of arrow E against the forces of the coil spring 27. Consequently, the guide member 19 is moved upwardly. The slide bar 40 engaging the recess 23 at its spherical end surface 40a is then moved in the direction of arrow F. The inclined surface 40b of the slide bar 40 pushes the inclined surface 43b of the actuator 43 and consequently, the first working shaft 44 is moved upwardly or in the direction of arrow B. The detecting rod 56 is moved upwardly, thereby turning the microswitch 58 on. The main spindle 4 is reverse rotated when the microswitch 58 is turned on. The rotational shaft 15 is reverse rotated and retracted to thereby withdraw the tap 16 from the threaded hole in the workpiece. When the rotational shaft 15 is returned to its upper limit position, the rotation of the main spindle 4 is stopped, as described above. Thus, the tap 16 may be prevented from suffering excessive forces.

The driver 7 is disengaged from the tapered portion 5 of the main spindle 4 when the chuck 6 is released. The shaft 12 is disengaged from the recess 13a of the support 13 when another working tool is intended to be attached to the main spindle 4.

According to the tap drive unit of the present invention, the driver 7 of the tap drive unit is coupled to the main spindle 4 of the machining center. The support member 10 is secured to the stationary portion of machining center. The external thread 18 formed in the outer perphery of the rotational shaft 15 is threadably engaged with the internal thread 20 formed in the inner periphery of the guide member 19. The tap drive unit in accordance with the present invention thus has a simple construction which is capable of accurately advancing the tap 16 in accordance with the rotation of the rotational shaft 15. As a result, threaded screw-holes may be formed with high level of accuracy even where the workpiece has a small thickness.

Since the main spindle 4 of the machining center is not required to be axially moved, the threaded screw-holes may be formed in the workpiece with high accuracy and ease even where the tap drive unit in accordance with this invention is mounted on the machining center which does not incorporate a rotary encoder for detecting the rotational speed of the main spindle 4 to move the machine-head 1 thereof. Furthermore, the vertical movement of the rotational shaft 15 and the movement of the guide member 19 are mechanically detected by the travel mechanism 29 and thereby transmitted to the detecting mechanism 49, thereby controlling the forward and reverse rotations of the main spindle 4. Consequently, the tap drive unit in accordance with this invention may be applied to the machining center which does not incorporate means for detecting the rotational speed of the main spindle 4.

Furthermore, the driver 7 may be attached to and detached from the main spindle 4 with ease since the upper ends of the first and second working shafts 44 and 46 of the travel mechanism 29 are provided in the vicinity of the lower ends of the detecting piece 52 and the detecting rod 56 of the detecting mechanism 49, respectively. The positioning of these members requires less accuracy as compared with the case where electrical connectors are employed for coupling the drive 7 to the main spindle 4. Accordingly, the tap drive unit in accordance with this invention may be constructed with ease.

Figure 5:
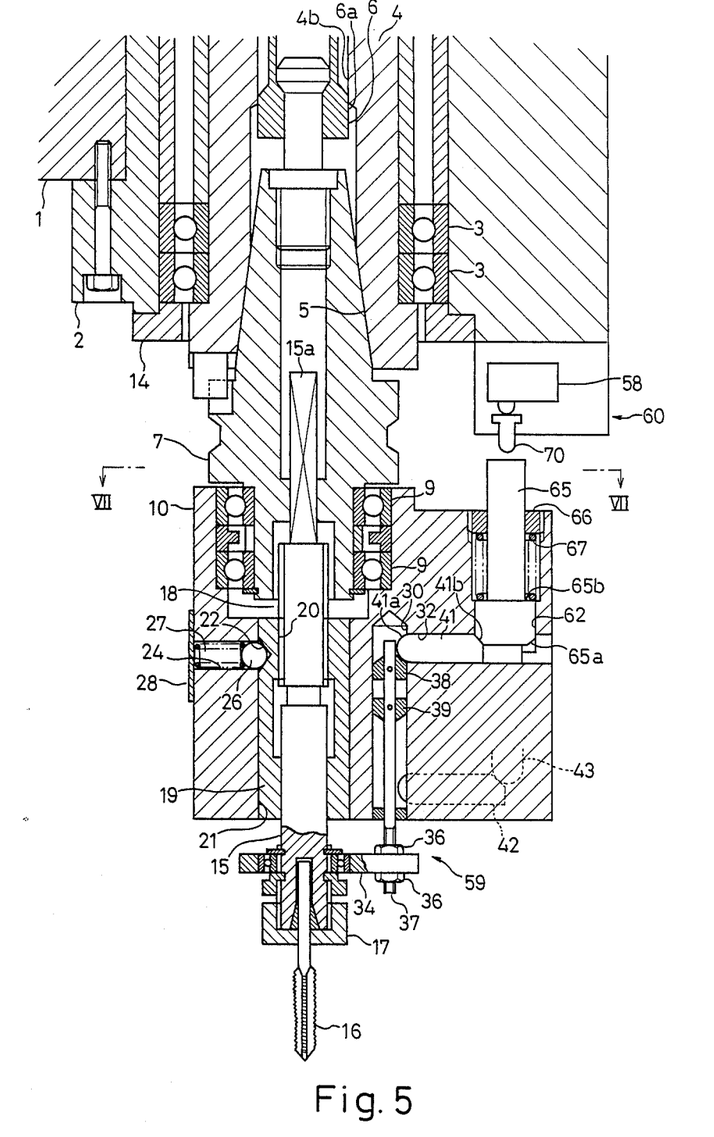
FIG. 5 is a longitudinal section of the tap drive unit of a second embodiment, which view is taken along line V—V in FIG. 7.
Figure 6:
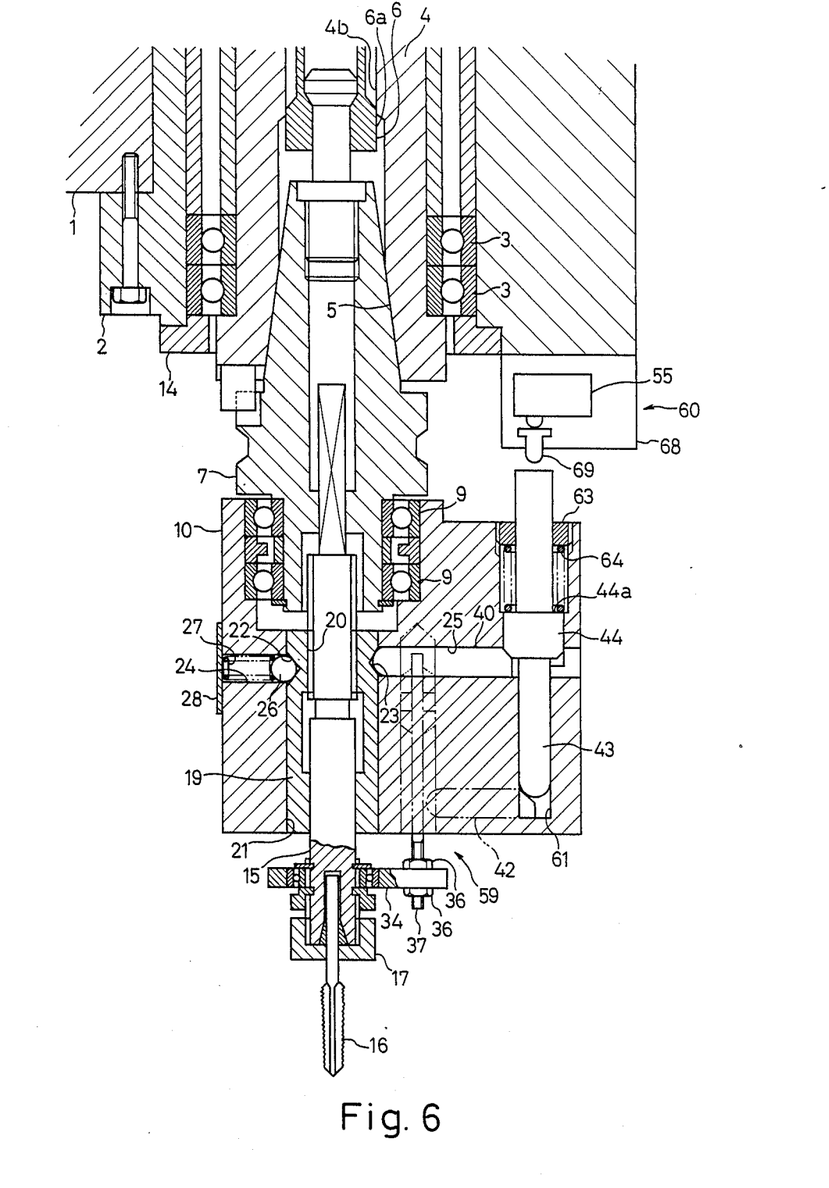
FIG. 6 is a longitudinal section taken along line VI—VI in FIG. 7.
Figure 7:
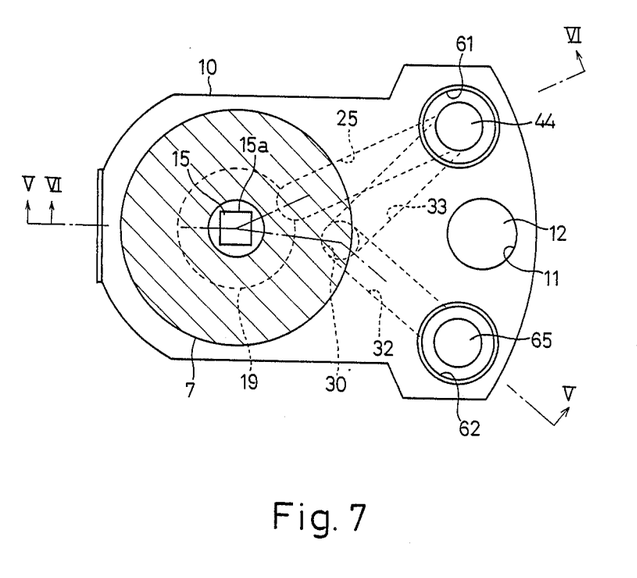
FIG. 7 is a transverse section taken along line VII—VII in FIG. 5.

FIGS. 5-7 illustrate a second embodiment of the tap drive unit in accordance with this invention. Travel mechanism 59 and detecting mechanism 60 have different constructions from those of the tap drive unit of the first embodiment. The travel mechanism 59 will first be described. Vertical holes 61 and 62 are provided in the support member 10 together with the vertical hole 30. The transverse holes 25 and 33 communicate with the attachment opening 21 and the vertical hole 30 at one end thereof, respectively. The other ends of the transverse holes 25 and 33 communicate with the vertical hole 61. The transverse hole 32 communicates to the vertical hole 30 at one end and to the vertical hole 62 at the other end. The first working shaft 44 is provided within the vertical hole 61. The actuator 43 is secured to the lower end of the first working shaft 44. A coil spring 64 downwardly biasing the first working shaft 44 is provided between a ring-nut 63 inserted into the upper end of the vertical hole 61 and the stepped portion 44a formed on the first working shaft 44. A second working shaft 65 having an inclined surface 65a at its lower end is provided within the vertical hole 62. The inclined surface 65a is in contact with the inclined surface 41b of the slide bar 41. A coil spring 67 downwardly biasing the second working shaft 65 is provided between a ring-nut 66 inserted into the upper end portion of the vertical hole 62 and a stepped portion 65b formed on the second working shaft 65.

A detecting mechanism 60 of the tap drive unit of the second embodiment will now be described. Two detecting pieces 69 and 70 are mounted on a holder 68 for vertical movement so as to be placed in the vicinity of the upper ends of the first and second working shafts 44 and 65 respectively. The microswitch 55 is provided ont he holder 68 so as to be opposite to the upper end of the detecting piece 69. The microswitch 58 is provided on the holder 68 so as to be opposite to the upper end of the detecting piece 70. Upon vertical movement of the rotational shaft 15 and upward movement of the guide member 19, the first and second working shafts 44 and 65 of the travel mechanism 59 are moved as in the first embodiment. The movement of the first and second working shafts 44 and 65 is mechanically transmitted to the detecting mechanism 60 thereby turning each of the microswitches 55 and 58 on and off. Accordingly, the forward and reverse rotations of the main spindle 4 are controlled as in the tap drive unit of the first embodiment.

Each of the travel mechanism 59 and the detecting mechanism 60 may be eliminated. The distance of the vertical movement of the rotational shaft 15 is proportional to the rotation of the main spindle 4. Accordingly, in the case where the machining center is provided with means for detecting the rotation speed of the main spindle 4, the forward and reverse rotations of the main spindle 4 may be controlled by the detecting means provided in the machining center. Furthermore, the movement of the guide member 19 may be detected by the microswitch or the like directly mounted on the support member 10 or through the slide bar 40.

The foregoing disclosure and drawings are merely illustrative of the principles of the present invention and are not to be interpreted in a limiting sense. The only limitation is to be determined from the scope of the appended claims.

What is claimed is:

1. A tap drive unit for a machine tool of the type having a main spindle, which is coupled to a machinehead of the machine tool such as a machining center, said tap drive unit comprising:
    (a) a driver detachably coupled to the main spindle of the machine tool so as to be rotated with the main spindle;
    (b) a support member rotatably supporting said driver, said support member being fixedly mounted on a stationary portion of the machine tool when said driver is coupled to the main spindle of the machine tool;
    (c) a tubular guide member supported by said support member so as to be coaxial relative to said driver, said guide member being provided with an internal thread formed in the inner periphery thereof, said guide member being moved axially when a load larger than a predetermined value acts thereon;
    (d) a rotational shaft provided with a tap detachably mounted on one end thereof and an external thread formed in the outer periphery thereof, the external thread being threadedly engaged with the internal thread of said guide member, said rotational shaft being coupled to said driver so as to be rotated by the driver, the rotational shaft being movable axially relative to said driver when rotated both in one direction and in the other;
    (e) a travel mechanism comprising first and second working shafts each provided on said support member so as to be parallel to said rotational shaft, said first working shaft being moved either when said rotational shaft is moved by a predetermined distance in the direction in which a thread to be normally formed with the tap in a prepared hole in a workpiece is advanced or when said guide member is moved axially when the load larger than the predetermined value acts upon said guide member, said second working shaft being moved when said rotational shaft is moved by a predetermined distance in the direction opposite to the direction in which the thread to be formed with the tap in the prepared hole in the workpiece is advanced; and
    (f) a detecting switch means provided on a stationary portion of the machine tool for detecting an amount of displacement of each of said first and second working shafts.

2. A tap drive unit as claimed in caim 1, wherein said second working shaft is formed into a tubular configuration and wherein said first working shaft is provided within said second working shaft so as to extend therethrough.

3. A tap drive unit for machine tools of the type having a machine head, a main spindle and a stationary portion, the top drive unit being coupled to the machine head of the machine tool, said tap driver unit comprising:
    (a) a driver detachably coupled to the main spindle of the machine tool so as to be rotated by the main spindle;
    (b) a support member rotatably supporting said driver, said support member being fixedly mounted on the stationary portion of the machine tool when said driver is coupled to the main spindle of the machine tool;
    (c) a tubular guide member supported by said support member so as to be coaxial with said driver, said guide member being provided with an internal thread formed in the inner periphery thereof, said guide member being moved axially when a load larger than a predetermined value acts thereon;
    (d) a rotational shaft carrying a tap detachably mounted on one end thereof, the tap having a pitch and the rotational shaft having an external thread formed in the outer periphery thereof, the external thread being threadedly engaged with the internal thread of the guide member, the rotational shaft being rotated when the rotation of the main spindle of the machine tool is transmitted thereto through said driver, thereby being axially moved in accordance with the pitch of the internal and external threads;
    (e) a travel mechanism provided on said support member so as to travel when said rotational shaft and said guide member are axially moved,
        said travel mechanism comprising first and second working shafts each provided on said support member so as to be parallel to said rotational shaft, said first working shaft being moved when said rotational shaft is moved by a predetermined distance in the direction that the thread to be formed by the tap in a prepared hole in a workpiece is advanced and when the guide member is moved, said second working shaft being moved when
        said rotational shaft is moved by a predetermined distance in the opposite direction to the direction in which the thread to be formed by the tap in a prepared hole in the workpiece is advanced; and
    (f) a detecting mechanism provided on a stationary portion of the machine tool for detecting the traveling distance of said travel mechanism; whereby obstruction of the movement of the tap imposes a load larger than the said predetermined value to thereby move the guide member axially to activate the detecting mechanism to reverse the rotating of the main spindle.

4. The tap drive unit of claim 3, wherein said second working shaft is formed into a tubular configuration and wherein said first working shaft is provided within said second working shaft so as to extend therethrough.

5. The tap drive unit of claim 3, wherein the pitch of the said internal and external threads is the same as the pitch of the tap.

* * * * *